United States Patent
Iyer et al.

(10) Patent No.: US 11,663,645 B2
(45) Date of Patent: May 30, 2023

(54) METHODS AND APPARATUSES FOR DETERMINING PERSONALIZED RECOMMENDATIONS USING CUSTOMER SEGMENTATION

(71) Applicant: Walmart Apollo, LLC, Bentonville, AR (US)

(72) Inventors: Rahul Iyer, Santa Clara, CA (US); Victor Anthony Perry, IV, San Francisco, CA (US); Prashant Chandrakant Saundade, San Jose, CA (US); Stephen Dean Guo, Saratoga, CA (US); Evren Korpeoglu, San Jose, CA (US); Kannan Achan, Saratoga, CA (US); Sandhya Ajit, San Jose, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 122 days.

(21) Appl. No.: 17/162,422

(22) Filed: Jan. 29, 2021

(65) Prior Publication Data
US 2022/0245701 A1    Aug. 4, 2022

(51) Int. Cl.
*G06Q 10/00* (2023.01)
*G06Q 30/0601* (2023.01)
(Continued)

(52) U.S. Cl.
CPC ... *G06Q 30/0631* (2013.01); *G06F 16/24578* (2019.01); *G06F 16/285* (2019.01);
(Continued)

(58) Field of Classification Search
None
See application file for complete search history.

(56) References Cited

U.S. PATENT DOCUMENTS

2010/0262602 A1* 10/2010 Dumon ............ G06F 16/90335
707/E17.108
2013/0035985 A1   2/2013 Gilbert
(Continued)

OTHER PUBLICATIONS

Wiggers, Kyle, Researchers propose a 'fairer' product recommendation algorithm, Jun. 4, 2020, KPMG, https://venturebeat.com/2020/06/04/researchers-propose-a-fairer-product-recommendation-algorithm/, p. 1-7. (Year: 2020).*
(Continued)

*Primary Examiner* — Joseph M Waesco
(74) *Attorney, Agent, or Firm* — Morgan, Lewis & Bockius LLP; Manita Rawat

(57) ABSTRACT

A category recommender system includes a computing device configured to obtain customer information characterizing a customer's interactions on an ecommerce marketplace. The computing device is further configured to determine discovery category rankings for each category of items available on the ecommerce marketplace for the customer based on the customer information, determine repeat category rankings for each category of items available on the ecommerce marketplace for the customer based on the customer information, and determine item rankings for each item in the ecommerce marketplace based on the customer information. The computing device is further configured to merge the discovery category rankings, the repeat category rankings and the item recommendation rankings into final recommendations based on one or more predetermined merging criteria and provide the final recommendations to the customer.

21 Claims, 9 Drawing Sheets

(51) Int. Cl.
  *G06Q 30/0204* (2023.01)
  *G06F 16/28* (2019.01)
  *G06F 16/2457* (2019.01)
  *G06N 20/00* (2019.01)
  *G06N 5/04* (2023.01)
  *G06F 16/9535* (2019.01)

(52) U.S. Cl.
  CPC ........... *G06F 16/9535* (2019.01); *G06N 5/04* (2013.01); *G06N 20/00* (2019.01); *G06Q 30/0204* (2013.01); *G06Q 30/0623* (2013.01); *G06Q 30/0633* (2013.01)

(56) References Cited

U.S. PATENT DOCUMENTS

| | | | | |
|---|---|---|---|---|
| 2014/0046794 | A1* | 2/2014 | Vallery | G06Q 30/0631 705/26.7 |
| 2014/0172627 | A1 | 6/2014 | Levy et al. | |
| 2014/0180853 | A1 | 6/2014 | Seidel et al. | |
| 2014/0379520 | A1* | 12/2014 | Nemery | G06Q 30/0623 705/26.7 |
| 2015/0170235 | A1* | 6/2015 | Mesaros | G06Q 30/0605 705/26.2 |
| 2017/0124628 | A1 | 5/2017 | Kirkby et al. | |
| 2017/0262926 | A1* | 9/2017 | High | G06K 7/10712 |
| 2017/0270586 | A1* | 9/2017 | Dumon | G06Q 30/0603 |
| 2017/0278132 | A1* | 9/2017 | Dennett | G06Q 30/0605 |
| 2018/0060696 | A1* | 3/2018 | Chen | G06F 18/2321 |
| 2018/0218430 | A1* | 8/2018 | Prendki | G06Q 30/0641 |
| 2020/0065761 | A1* | 2/2020 | Tatchell | G06Q 20/3825 |
| 2020/0211000 | A1* | 7/2020 | Narasimhan | G06Q 20/3678 |
| 2020/0372073 | A1* | 11/2020 | Dahl | G06F 16/188 |
| 2022/0138831 | A1* | 5/2022 | Yoo | G06Q 30/0631 705/7.33 |

OTHER PUBLICATIONS

Jekanowski et al., "Food Purchase Diversity Across U.S. Markets", 2000, p. 1-18.

* cited by examiner

METHODS AND APPARATUSES FOR DETERMINING PERSONALIZED RECOMMENDATIONS USING CUSTOMER SEGMENTATION

TECHNICAL FIELD

The disclosure relates generally to methods and apparatuses for determining personalized recommendations using customer segmentation. More particularly, the disclosure relates to methods and apparatuses for determining personalized recommendations using customer segmentation in ecommerce marketplaces.

BACKGROUND

At least some ecommerce marketplaces can include recommender systems that can provide recommendations to customers that may be shopping, browsing or otherwise interacting with the marketplace. Recommender systems can use historical data from customers to recommend items for purchase. Recommender systems can use models, algorithms or other methods to recommend items to customers. The models, algorithms or other methods can use traditional open source packages or traditional algorithms to recommend such items to customers.

Existing recommender systems have several drawbacks. One such drawback is that the recommender systems can be poorly suited for recommending new items that may have been added to the ecommerce marketplace or for recommending items that the customer may be interested in but have not explored or recently viewed during the customer's interactions with the ecommerce marketplace. Such drawbacks can limit the operator of the marketplace from raising awareness of new items and awareness of items that the customer has not viewed or explored. These limitations can result in lost opportunities for the retailer or other operator of the ecommerce marketplace that can result in lower revenues and lower customer satisfaction that might otherwise be achieved. There exists a need, therefore, for improved recommender systems that have improved functionality to improve and/or promote the exploration of new categories and new items on the ecommerce marketplace.

SUMMARY

The embodiments described herein are directed to methods and apparatuses for

In accordance with various embodiments, exemplary systems may be implemented in any suitable hardware or hardware and software, such as in any suitable computing device. For example, in some embodiments, a category recommender system can include a computing device configured to obtain customer information characterizing a customer's interactions on an ecommerce marketplace. The computing device can be further configured to determine discovery category rankings for each category of items available on the ecommerce marketplace for the customer based on the customer information, determine repeat category rankings for each category of items available on the ecommerce marketplace for the customer based on the customer information, and determine item rankings for each item in the ecommerce marketplace based on the customer information. The computing device can be further configured to merge the discovery category rankings, the repeat category rankings and the item recommendation rankings into final recommendations based on one or more predetermined merging criteria and provide the final recommendations to the customer.

In one aspect, the computing device can determine a customer segment of the customer based on past transactions of the customer on the ecommerce marketplace, and wherein the predetermined merging criteria are based on the customer segment of the customer.

In another aspect, the discovery category rankings can be determined by a discovery category engine using collaborative filtering and matrix factorization.

In another aspect, the discovery category rankings can be determined using a trained discovery category machine learning model.

In another aspect, the repeat category rankings are determined by a repeat category engine using a random forest model with a plurality of repeat category features.

In another aspect, the plurality of repeat category features can include a Simpson Index for each category.

In another aspect, the item rankings can be determined by an item recommendation engine using collaborative filtering and matrix factorization.

In another aspect, the item rankings indicate items in selected discovery categories and selected repeat categories to include in the final recommendations.

In other embodiments of the present disclosure a method for determining category rankings to be provided to a customer is provided. The method can include obtaining customer information characterizing a customer's interactions on an ecommerce marketplace. The method can also include determining discovery category rankings for each category of items available on the ecommerce marketplace for the customer based on the customer information, determining repeat category rankings for each category of items available on the ecommerce marketplace for the customer based on the customer information, and determining item rankings for each item in the ecommerce marketplace based on the customer information. The method can also include merging the discovery category rankings, the repeat category rankings and the item recommendation rankings into final recommendations based on one or more predetermined merging criteria and providing the final recommendations to the customer.

In other embodiments in accordance with the present disclosure, a non-transitory computer readable medium is provided. In some embodiments, the non-transitory computer readable medium can have instructions stored thereon, wherein the instructions, when executed by at least one processor, can cause the processor to perform operations including obtaining customer information characterizing a customer's interactions on an ecommerce marketplace. The operations can also include determining discovery category rankings for each category of items available on the ecommerce marketplace for the customer based on the customer information, determining repeat category rankings for each category of items available on the ecommerce marketplace for the customer based on the customer information, and determining item rankings for each item in the ecommerce marketplace based on the customer information. The operations can also include merging the discovery category rankings, the repeat category rankings and the item recommendation rankings into final recommendations based on one or more predetermined merging criteria and providing the final recommendations to the customer.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
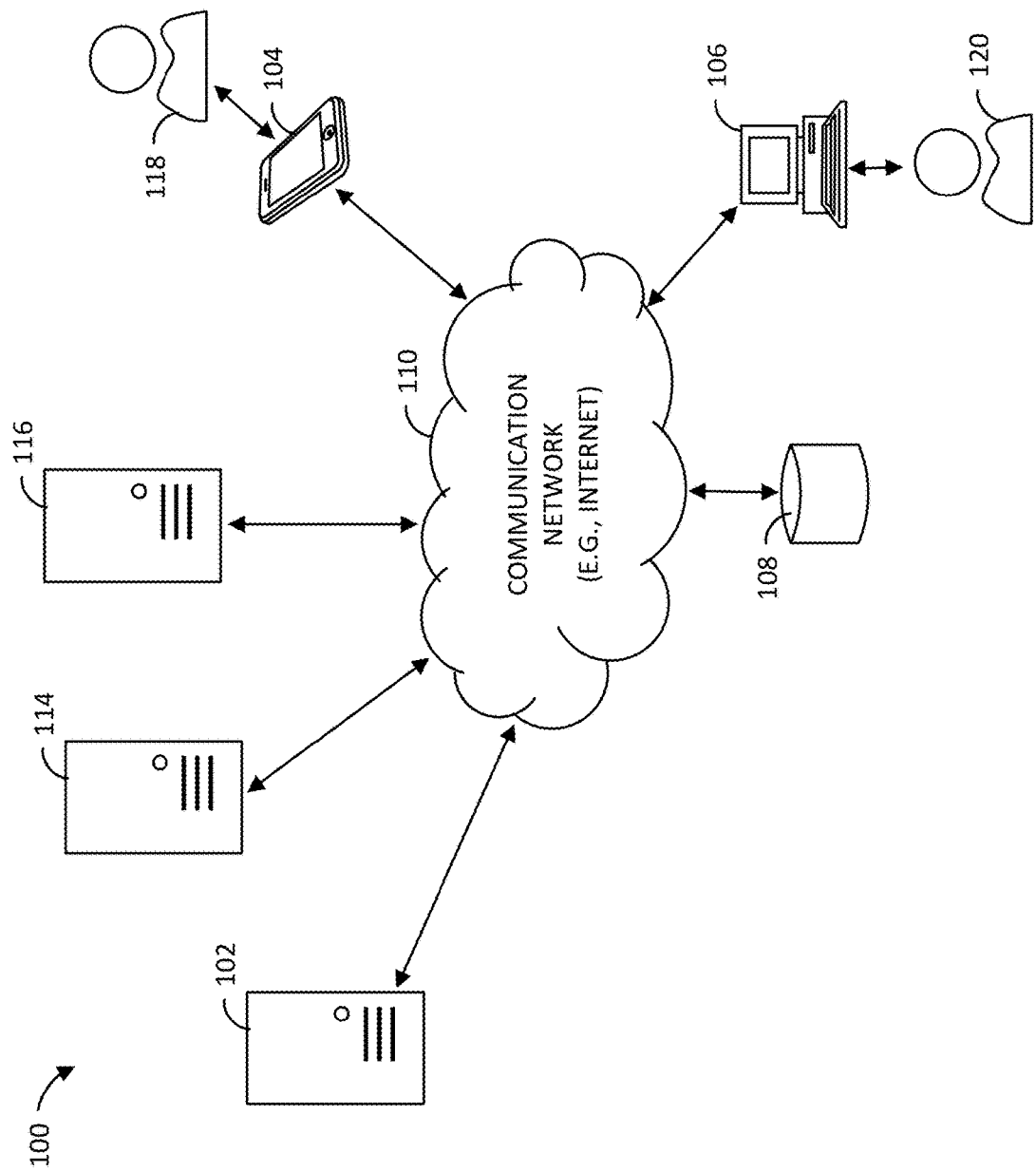
FIG. 1 is a block diagram of a category recommender system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "connected," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

In some ecommerce marketplaces, the marketplace can include a recommender system that can operate to provide recommendations to the customers that are using the marketplace. The recommender systems can, for example, provide recommendations to the customers such as recommended substitute items, recommended items for purchase or other recommendations. These recommendations can be presented or displayed to the customers by showing such recommended items on the ecommerce marketplace website. On some ecommerce marketplace websites, recommendations can be displayed to the user in form of one or more carousals. Carousals can be, for example, a row or column of recommended items that the customer can view, scroll through, click or take other actions as are allowed by the functionality of the website. Often, the operators (e.g., retailers, sellers, etc.) of the ecommerce marketplaces use recommender systems that can present popular or top-selling items as recommendations to customers. In such existing recommender systems, for example, the retailer can present three carousals to customers that show the popular or top-selling items. These existing recommender systems have little personalization for the individual customer because the recommended items may be based on aggregate historical sales information across many customers. Furthermore, these existing recommender systems do not encourage customers to explore new categories of items that may be for sale on the ecommerce marketplace. Such shortcomings cause the retailer to sell less items and collect less revenue than may be possible if the recommender system were more personalized and/or encourage customers to explore new items or new categories of items on the ecommerce marketplace.

The methods and apparatuses of the present disclosure address these shortcomings and provide personalized recommendations and present recommendations that may encourage customers to explore new items and new categories of items on the ecommerce marketplace. The methods and apparatuses of the present disclosure can include a discovery category engine, a repeat category engine and an item recommendation engine. The results and/or rankings from these engines can merged together using a merging engine that can present a blend of repeat items and new or discovery items to prepare a final set of recommendations that can be presented to the customer to not only easily allow a customer to purchase repeat items but to explore or discovery new items and new categories of items available on the ecommerce marketplace. The methods and apparatuses of the present disclosure can provide recommendations of repeat items to a customer while also presenting new or discovery items. The methods and apparatuses of present disclosure can balance mix of repeat items with new items by considering one or more customer segments that the customer may fall into. Based on the customer segment (that may have different purchasing and shopping tendencies), the mixture of repeat items and new items can be personalized to increase the likelihood that the customer will continue to purchase those items that it repeatedly purchases while also discovering and/or purchasing new items. In this manner, the amount of cannibalization of existing sales can be minimized and the overall sales and revenue of the retailer can be increased. Such personalization can increase customer satisfaction as well.

Turning to the drawings, FIG. 1 illustrates a block diagram of an example category recommender system 100 that includes a recommender computing device 102 (e.g., a server, such as an application server), a central ordering computing device 114, a customization computing device 116 (e.g., a web server), a database 108, and multiple customer computing devices 104, 106 operatively coupled over network 110. Recommender computing device 102, central ordering computing device 114, customization computing device 116, and multiple customer computing devices 104, 106 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 110.

In some examples, recommender computing device 102 can be a computer, a workstation, a laptop, a server such as a cloud-based server, or any other suitable device. In some examples, each of the multiple customer computing devices 104, 106 can be a cellular phone, a smart phone, a tablet, a personal assistant device, a voice assistant device, a digital assistant, a laptop, a computer, or any other suitable device. In some examples, recommender computing device 102 and the central ordering computing device 114 can be operated and/or controlled by a retailer, and multiple customer computing devices 104, 106 are operated by users or customers.

The central ordering computing device 114 can be distributed among one or more workstations or servers that are coupled together over the network 110. The central ordering computing device 114 can cause an ecommerce marketplace to be displayed or otherwise communicated via one or more websites. The customers 118, 120 can view, browse and order items that may be made available via the ecommerce marketplace. The central ordering computing device 114 can collect information for such orders including item information, payment information, delivery information and the like. The central ordering computing device 114 can store such information and/or send such information for storage in the database 108 or in other components of the category recommender system 100.

The customization computing device 116 can also be distributed among one or more workstations or servers that are coupled together over the network 110. In other examples, the customization computing device 116 can be a single computing device as shown. The customization computing device 116 can include various personalization engines that can deliver customized or personalized content, information or other data to the central ordering computing device 114 and/or to other elements of the system. The customization computing device 116 can be a recommender system, for example, that can deliver recommendations to the customer computing devices 104, 106. In other examples, the customization computing device 116 can be a substitution system or other personalization system of the retailer.

Recommender computing device 102 can also be operable to communicate with database 108 over the communication network 110. The database 108 can be a remote storage device, such as a cloud-based server, a memory device on another application server, a networked computer, or any other suitable remote storage. Although shown remote to recommender computing device 102, in some examples, database 108 can be a local storage device, such as a hard drive, a non-volatile memory, or a USB stick.

Communication network 110 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 110 can provide access to, for example, the Internet.

The customer computing devices 104, 106 may communicate with the central ordering computing device 114 over communication network 110. For example, the central ordering computing device 114 may host one or more ecommerce marketplaces on one or more websites. Each of the customer computing devices 104, 106 may be operable to view, access and interact with the websites hosted by the central ordering computing device 114. In some examples, the central ordering computing device 114 can allow a customer 118, 120, via the customer computing devices 104, 106, to browse, search and/or select products for purchase. As will be further explained, the central ordering computing device 114 can also personalize the websites through the display of category or item recommendations or through other personalized content via the customer computing device 104, 106.

Figure 2:
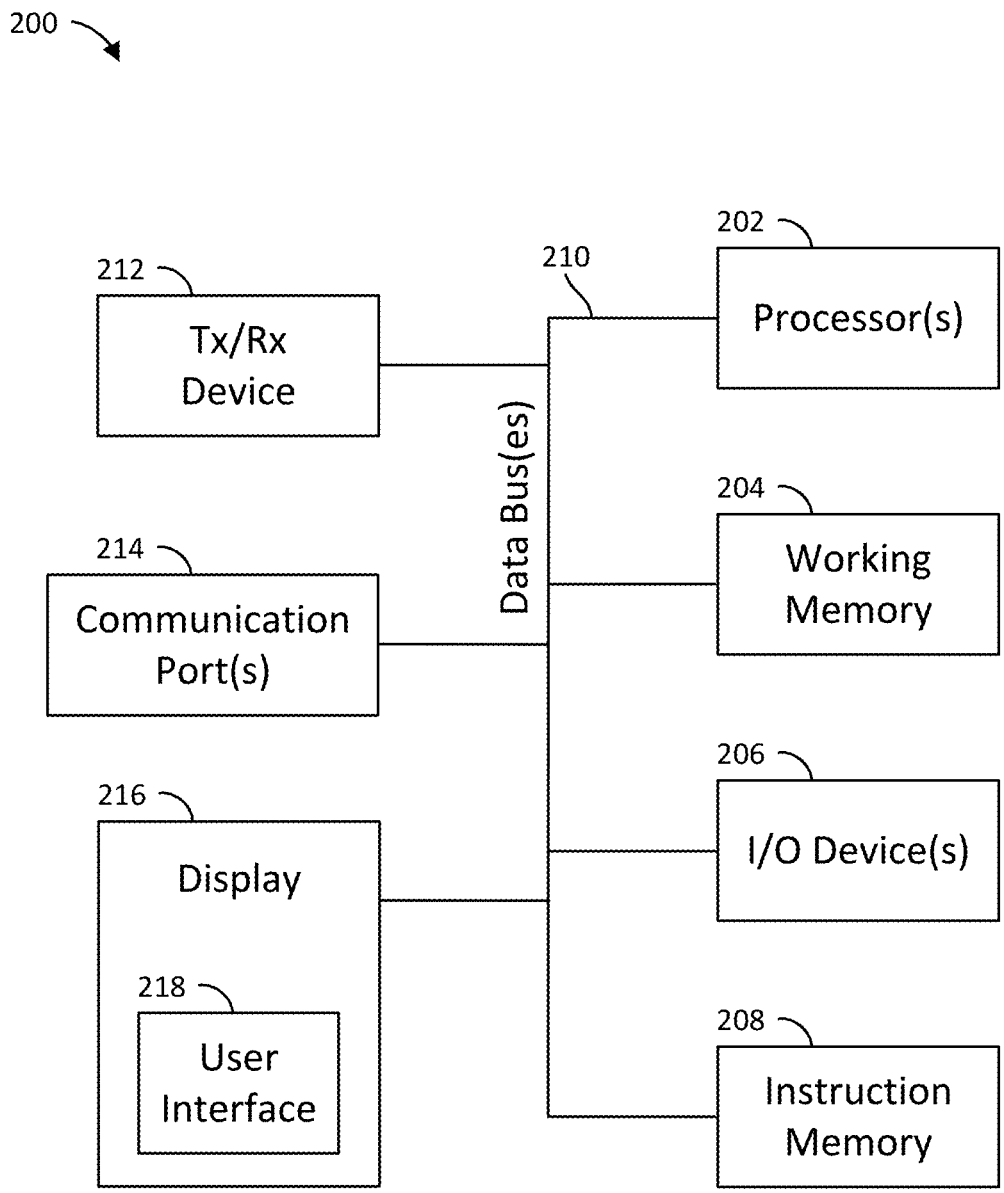
FIG. 2 is a block diagram of a recommender computing device of the system of FIG. 1 in accordance with some embodiments.

FIG. 2 illustrates an example computing device 200. The recommender computing device 102, the central ordering computing device 114, the customization computing device 116, and/or the customer computing devices 104, 106 may include the features shown in FIG. 2. For the sake of brevity, FIG. 2 is described relative to the recommender computing device 102. It should be appreciated, however, that the elements described can be included, as applicable, in the central ordering computing device 114, the customization computing device 116, and/or the customer computing devices 104, 106.

As shown, the recommender computing device 102 can be a computing device 200 that may include one or more processors 202, working memory 204, one or more input/output devices 206, instruction memory 208, a transceiver 212, one or more communication ports 214, and a display 216, all operatively coupled to one or more data buses 210. Data buses 210 allow for communication among the various devices. Data buses 210 can include wired, or wireless, communication channels.

Processors 202 can include one or more distinct processors, each having one or more cores. Each of the distinct processors can have the same or different structure. Processors 202 can include one or more central processing units (CPUs), one or more graphics processing units (GPUs), application specific integrated circuits (ASICs), digital signal processors (DSPs), and the like.

Processors 202 can be configured to perform a certain function or operation by executing code, stored on instruction memory 208, embodying the function or operation. For example, processors 202 can be configured to perform one or more of any function, method, or operation disclosed herein.

Instruction memory 208 can store instructions that can be accessed (e.g., read) and executed by processors 202. For example, instruction memory 208 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 202 can store data to, and read data from, working memory 204. For example, processors 202 can store a working set of instructions to working memory 204, such as instructions loaded from instruction memory 208. Processors 202 can also use working memory 204 to store dynamic data created during the operation of the recommender computing device 102. Working memory 204 can be a random access memory (RAM) such as a static random access memory (SRAM) or dynamic random access memory (DRAM), or any other suitable memory.

Input-output devices 206 can include any suitable device that allows for data input or output. For example, input-output devices 206 can include one or more of a keyboard, a touchpad, a mouse, a stylus, a touchscreen, a physical button, a speaker, a microphone, or any other suitable input or output device.

Communication port(s) 214 can include, for example, a serial port such as a universal asynchronous receiver/transmitter (UART) connection, a Universal Serial Bus (USB) connection, or any other suitable communication port or connection. In some examples, communication port(s) 214 allows for the programming of executable instructions in instruction memory 208. In some examples, communication port(s) 214 allow for the transfer (e.g., uploading or downloading) of data, such as customer information, category information, user-category information, taxonomy information and the like.

Display 216 can display a customer interface 218. Customer interfaces 218 can enable customer interaction with the recommender computing device 102. For example, customer interface 218 can be a customer interface that allows an operator to interact, communicate, control and/or modify different features or parameters of the recommender computing device 102. The customer interface 218 can, for example, display the performance of the recommender computing device 102, discovery category rankings, repeat category rankings, item rankings and/or final recommendations. In some examples, a customer can interact with customer interface 218 by engaging input-output devices 206. In some examples, display 216 can be a touchscreen, where customer interface 218 is displayed on the touchscreen.

Transceiver 212 allows for communication with a network, such as the communication network 110 of FIG. 1. For example, if communication network 110 of FIG. 1 is a cellular network, transceiver 212 is configured to allow communications with the cellular network. In some examples, transceiver 212 is selected based on the type of communication network 110 recommender computing device 102 will be operating in. Processor(s) 202 is operable to receive data from, or send data to, a network, such as communication network 110 of FIG. 1, via transceiver 212.

Figure 3:
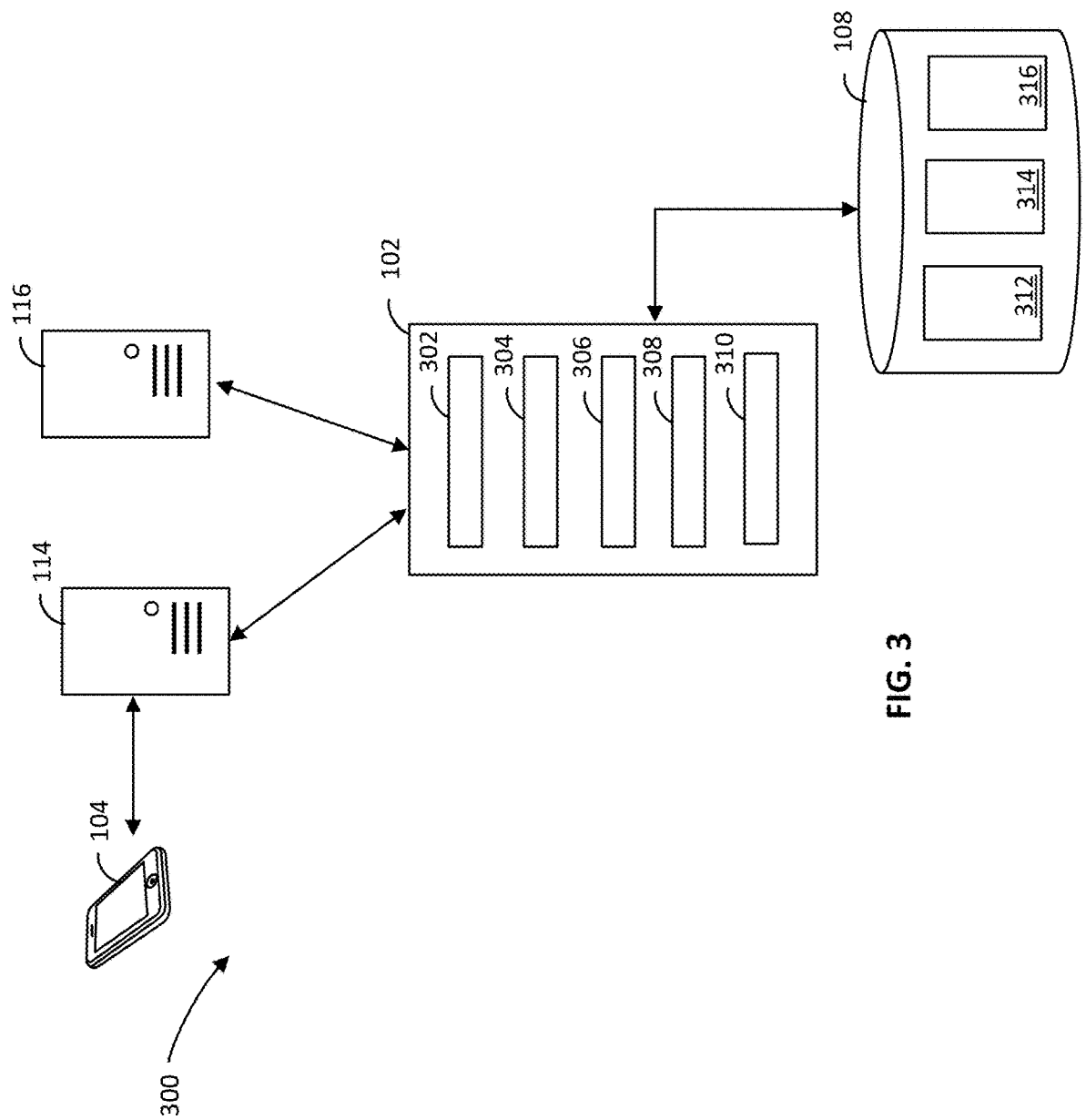
FIG. 3 is a block diagram illustrating examples of various portions of the category recommender system of FIG. 1.

Turning now to FIG. 3, an example category recommender system 300 is shown. The category recommender system 300, in this example, includes recommender computing device 102, central ordering computing device 114, customization computing device 116, and database 108. The recommender computing device 102 can be coupled to the central ordering computing device 114, the customization computing device 116 and the database 108 using any suitable wired or wireless connection such as by network 110 previously described. The customer computing device 104 can also be coupled to the central ordering computing device 114 and/or to the recommender computing device 102.

The recommender computing device 102 can operate to determine final recommendations and/or featured categories that can be displayed to a customer using the ecommerce marketplace. The final recommendations and/or the featured categories can include a blend of repeat categories/items and new categories/items. The final recommendations and/or the featured categories can be based on a customer segment that the recommender computing device has determined that the customer should be grouped into based on the one or more characteristics of the customer.

As shown, the recommender computing device 102 can include a data acquisition engine 302, a discovery category engine 304, a repeat category engine 306, an item recommendation engine 308 and a merging engine 310. The data acquisition engine 302 can obtain data and information from other computing devices, data storage devices, servers, and the like. The data acquisition engine 302 can, for example, use any suitable methods to obtain data and information from data sources such as application protocol interfaces (APIs) or other data acquisition methods. The data acquisition engine 302 can obtain customer information and category information and item information from the database 108, the central ordering computing device 114 or the customization computing device 116, for example.

The discovery category engine 304 can determine discovery category rankings that can rank the categories of items that are available on the ecommerce marketplace in order of the likelihood that a customer will choose an item in the category to further explore and possibly purchase. The goal of the rankings to determine which categories of items to present to the customer to encourage the customer to explore new items. When the term "discovery" is used in the present disclosure to describe an item or a category (i.e., a discovery item, a discovery category or the like), the term is used to describe an item or a category that the retailer would like to encourage the customer to explore because the customer has not generally purchased or viewed items from such category. As will be further described the discovery category engine 304 can include a discovery category model that can use machine learning or other suitable methods or techniques to determine the discovery category rankings.

The recommender computing device 102 can also include the repeat category engine 306. The repeat category engine 306 can determine repeat category rankings that can rank the categories of items that are available on the ecommerce marketplace that the customer has purchased in the past in order of likelihood that a customer will choose a new item from the same category. As will be further described, the repeat category engine 306 can include a repeat category model that can use machine learning or other suitable methods or techniques to determine repeat category rankings.

The recommender computing device 102 can also include the item recommendation engine 308. The item recommendation engine 308 can determine an item ranking for each item in each category. The item rankings can be used to display items within the identified discovery categories and the repeat categories to present to the customer. The item recommendation engine 308 can include an item recommendation model that can use machine learning or other suitable methods or techniques to determine the item rankings.

The merging engine 310 can merge and/or blend the discovery category rankings, the repeat category rankings and the item rankings to determine final recommendations and/or final featured categories. The final recommendations can include which categories to present to the customer and which items within those categories to present to the customer. The blend of discovery categories and repeat categories has a goal of encouraging new items to be viewed and/or purchased by the customer. The merging engine 310 can include one or more merging models that can use one or more rules and/or one or more characteristics of a customer or of a customer segment to determine the blend of repeat and discovery categories to include in the recommendations to be presented to the customer.

The recommender computing device 102 can also be coupled to the database 108. The recommender computing device 102 can access various types and quantities of data from the database 108. The database 108, for example, can include the customer information 312, the historical purchase information 314 and taxonomy information 316. The recommender computing device 102 can also store the final recommendations or the featured categories in the database 108. In some examples, the customization computing device 116 (or other elements of the category recommender system 300) can obtain the stored final recommendations or the featured categories from the database 108.

Figure 4:
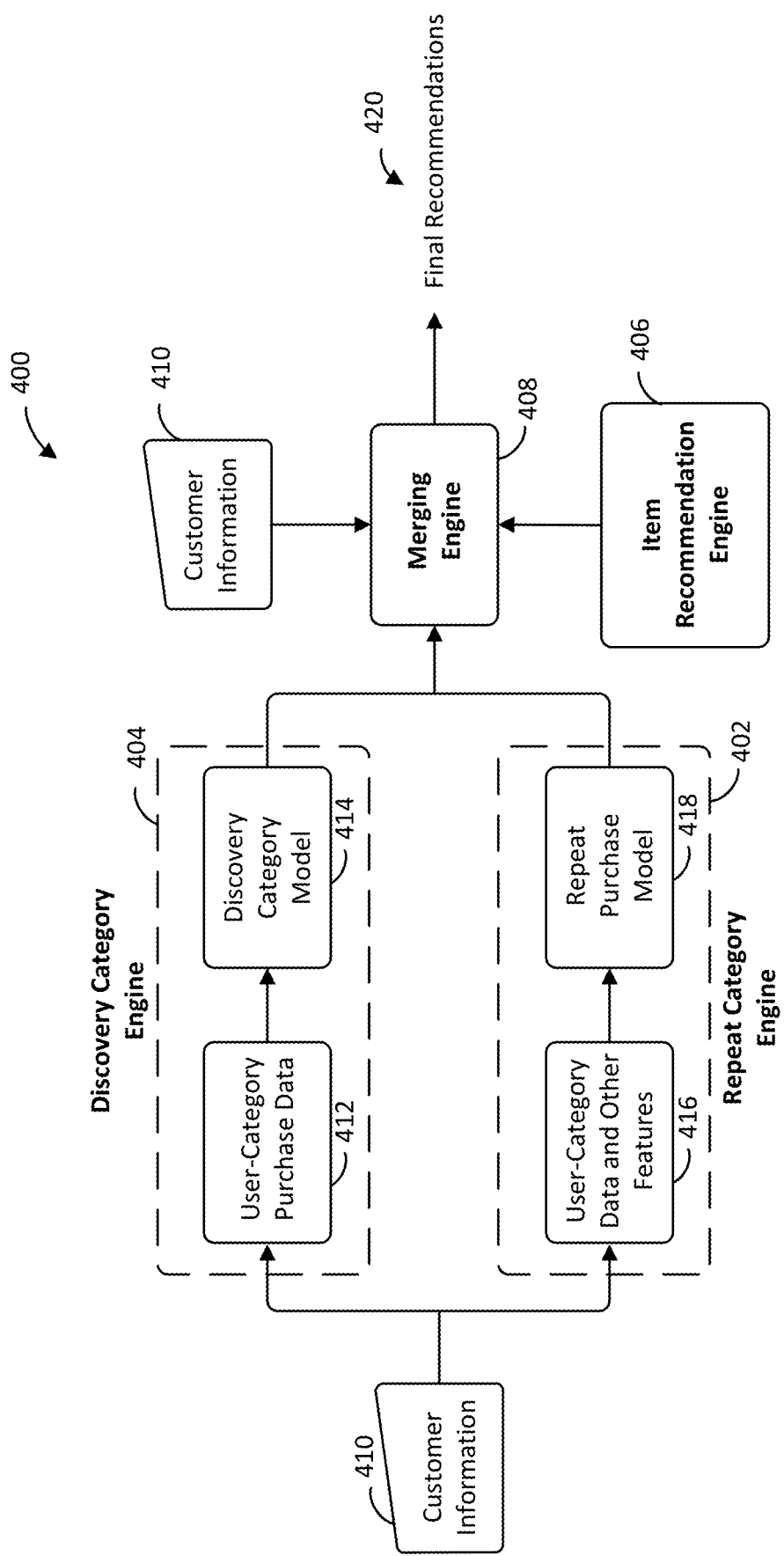
FIG. 4 is a block diagram showing an example architecture of a category recommender system in accordance with the present disclosure.

Referring now to FIG. 4, another example recommender computing device 400 is shown. The illustration of FIG. 4 shows further aspects of the recommender computing device 102 previously described. As shown in this example, the recommender computing device 400 can include a repeat category engine 402, a discovery category engine 404, an item recommendation engine 406 and a merging engine 408. The data acquisition engine (not shown) can obtain customer information 410. The customer information can be input into the discovery category engine 404. The customer information 410 can be used to determine the user-category purchase data 412 that can be a subset of the customer information and can be filtered or processed before the user-category purchase data 412 is input into a discovery category model 414. The output of the discovery category model 414 can be discovery category rankings. The discovery category rankings can then be input into the merging engine 408.

A similar information flow or process can be followed by the repeat category engine 402. The customer information 410 can be input into the repeat category engine 402. The customer information can be filtered and/or processed to obtain user-category data and other features 416. This user-category data and other features 416 can be input into a repeat purchase model 418. The repeat purchase model 418 can determine repeat category rankings. These rankings can then be input into the merging engine 408.

Item rankings can be determined by the item recommendation engine 406. These item rankings can also be input into the merging engine 408 along with other customer information 410. The merging engine 408 can blend the discovery category rankings from the discovery category model 414, the repeat category rankings from the repeat purchase model 418, the item rankings from the item recommendation engine 406 and the customer information 410 to determine the final recommendations or featured categories 420.

The framework previously described and illustrated in FIG. 4 uses and underlying concept that different customers need to be presented with different recommendations and different featured categories on the ecommerce marketplace. This concept has been determined by observation and analysis of data regarding customers on the ecommerce marketplace. In general, it has been observed that customers can be segmented or grouped into different categories based on the customers' engagement with the ecommerce marketplace. Based on the customers' engagement, the customers are more or less likely to explore new items and to purchase new items on the ecommerce marketplace. In general, new customers are unfamiliar with an ecommerce marketplace and there is little historical data for new customers. Therefore, new customers should be shown existing or traditional recommended categories that may include popular categories or top-rated items/categories. More experienced customers (i.e., customers that have used and purchased items on the ecommerce marketplace before) may purchase items from new categories because they are familiar with the platform but still may not know the extent of the catalog of items available on the marketplace. Finally, very experienced customers (i.e., customers with extensive experience on the marketplace that has made many purchases) may not want to explore new items and are set in their patterns of repeated purchases.

These general observations lead to the segmenting customers into one or more identified customer segments. The example here groups customers into four customer segments. In other examples, however, more or less than four customer segments can be used with the methods and apparatuses of the present disclosure. In one example, the four customer segments include (1) new customers that have no transactions on the ecommerce marketplace, (2) nursery customers that have two to four transactions on the ecommerce marketplace, (3) engaged customers that have more than five transactions within a thirteen week period and with an average gap between orders of greater than seven days, and (4) super-engaged customers that have more than five transactions within a thirteen week period and with an average gap between orders of less than or equal to seven days. In other examples, the customer segments can have other characteristics or other rules that can define whether a customer belongs to a particular customer segment.

In a first stage of processing, the data acquisition engine 302 can obtain customer information 410 each of the customer segments. Customer information is data that characterizes a customer's interactions with the ecommerce marketplace. Customer information can, for example, include data regarding prior purchases on the ecommerce marketplace. Such information can also include category and taxonomy data for the items that have been purchased and are otherwise available on the ecommerce marketplace.

In one example, the customer information that can be obtained is for a different period of time for each customer segment. In other examples, the same period of time for each customer segment can be used. In the example in which different periods of time are used for different customer segments, customer information for the previous six months is obtained for the super-engaged customer segment. Because super-engaged customers shop frequently, their habits and intents change frequently therefore a shorter period of time is used. For the nursery and the engaged customer segments, the same period of time can be used. For these customer segments, customer information from the previous one year can be used. For new users, there is no historical data available, so three months of transaction data across all customers can be used to determine popular categories of items.

As previously described, the discovery category engine 404 of the recommender computing device 400 can then determine a discovery category ranking for each category of goods for each customer (or user). The discovery category ranking can indicate a likelihood that the user will purchase an item from a new category that the user has not purchased from before. To make this determination, the discovery category engine 404 can include a discovery category model 414. Any suitable method or algorithm can be used. In one example, the discovery category model 414 can utilize a collaborative filtering based approach using matrix factorization to determine the discovery category rankings. This type of approach can solve the sparse data problem associated with the available customer data. It is likely that there is not enough data in the customer information 410 to rank the categories for each user. Because of this problem, matrix factorization can be used.

In the example that utilizes collaborative filtering using matrix factorization, the customer information can be used to build a User Factor matrix U and a Category Factor Matrix C. The predicted User-Category Interaction can be described by Equation 1 below.

$$\hat{r}_{ij} = \Sigma_{f=0}^{nfactors} U_{i,f} C_{f,j} \qquad \text{Equation 1}$$

Figure 5:
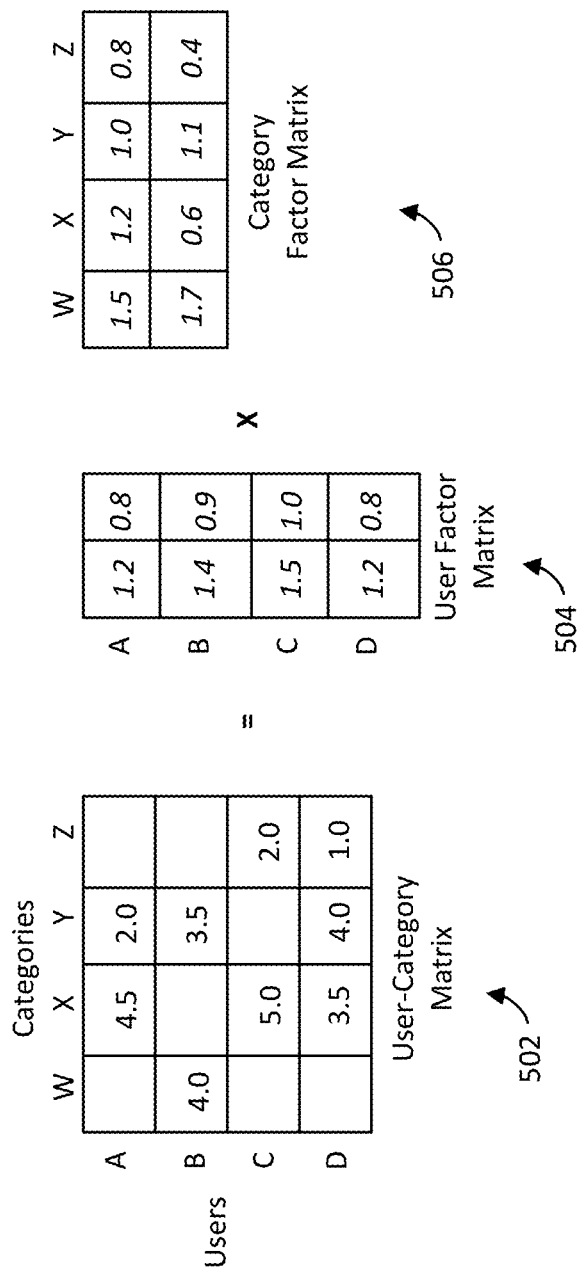
FIG. 5 is an illustration of a User-Category Matrix used by a discovery category engine in accordance with some embodiments.

As shown in FIG. 5, the User-Category Matrix 502 can be determined as the product of the User Factor Matrix 504 and the Category Factor Matrix 506. As can be seen, the There is not enough data in the customer information 410 to create a complete User-Category Matrix 502. The discovery category model 414 can attempt to predict accurate scores to fully populate the User-Category Matrix 502. One method of doing so is using an Alternating Least Square (ALS) training routine. In such a routine, the discovery category model 414 minimizes two loss function alternatively. First, the discovery category model 414 can hold the User Factor Matrix 504 fixed and run gradient descent with the Category Factor Matrix 506. Next, the discovery category model 414 can hold the Category Factor Matrix 506 fixed and run gradient descent with the User Factor Matrix. The objective function is to minimize the difference between the true and predicted user-category interaction as defined by Equation 2 below, where R is the predicted user-category interaction matrix.

$$\underset{U,C}{\operatorname{argmin}} \|R - \tilde{R}\|_F + \alpha \|U\|_2 + \beta \|C\|_2 \qquad \text{Equation 2}$$

The gradient descent can be run in parallel across multiple partitions of the underlying training data of the customer data to train the discovery category model 414. Any suitable open source or proprietary machine learning applications, packages or libraries can be used to perform such training of the discovery category model 414.

After the discovery category model 414 is trained using the training method previously described, the trained discovery category model 414 can be used to determine the discovery category rankings for customers. Once the User-Category Matrix is built, the User-Category Matrix can be factorized into 2 sub-matrices to obtain Latent User Factors U and Latent Category Factors C. The discovery category rankings can then be determined by ranking the discovery categories using cosine similarity according to Equation 3 below.

$$\operatorname{Cosine}(\overline{U}, \overline{C}) = \frac{\overline{U} \cdot \overline{C}}{\|\overline{U}\| \|\overline{C}\|} \qquad \text{Equation 3}$$

After the discovery category rankings are determined the discovery category engine 404 can store the discovery category rankings in a suitable data store, such as in database 108.

Referring back to FIG. 4 and as described above, the repeat category engine 402 can operate to determine a repeat category ranking for a user. The repeat category engine 402 can include a repeat purchase model 418 that can determine the repeat category rankings. The repeat purchase model 418 can use any suitable method, algorithm or technique to determine the repeat category rankings. As described, the repeat category rankings can rank the categories (or departments) of items that a customer has previously purchased an item by their likelihood of making a purchase of a new item (i.e., an item that the particular user has never purchased before) in the same category. In one example, a random forest model can be used to determine the repeat category rankings.

Figure 6:
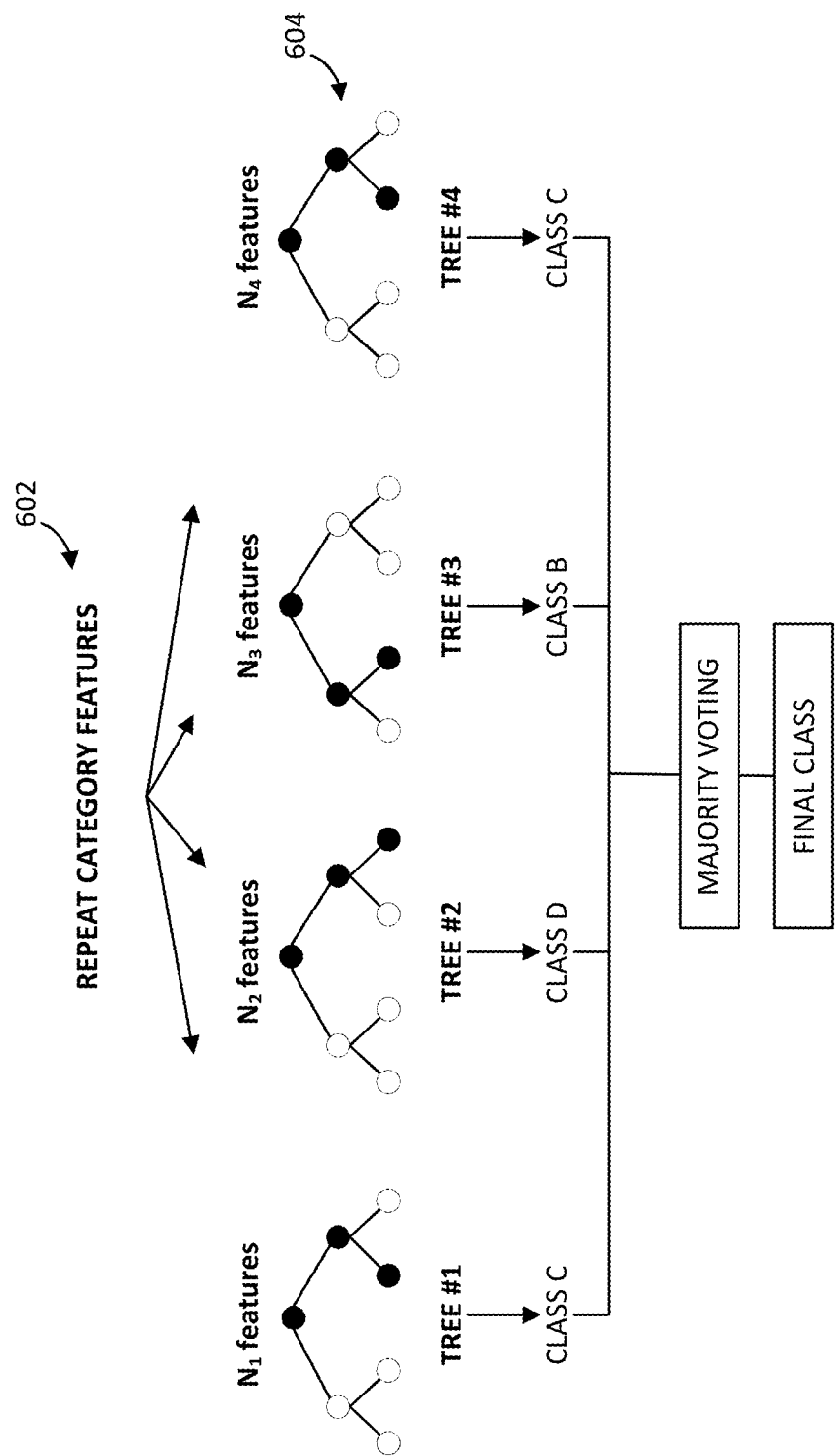
FIG. 6 is an illustration of a decision trees of a random forest model showing aspects of the repeat category engine in accordance with some embodiments.

As shown in FIG. 6, the random forest model can use multiple repeat category features 602 that are used to build multiple decision trees 604. Each tree 604 can pick from a random subset of all repeat category features 602 and can force variation between the trees 604 and lower the correlation between the trees 604. Thus, a tendency to overfit training data can be corrected and result in a better model than regression. Any suitable open source or proprietary application, software package or library can be used to build the random forest model.

As previously stated, the repeat purchase model 418 can use various repeat category features 602. The repeat category features 602 can include various information regarding the customer, the customer's historical purchase data, and other data points that can be useful in determining the likelihood that the customer will purchase a new item in a repeat category of items. Example types of information that can be used as repeat category features include customer interpurchase intervals, the number or total items in a customer's order, a total dollar amount in a customer's order, a number of unique items in a customer's order, the customer segment of the customer, number of recent purchases, repurchase history of the customer and the like.

Another measure that can be used as a repeat category feature is a Simpson Index score for a category of items. A Simpson Index $\lambda$ is a measure of diversity and can be determined using Equation 4 below, where p(i) is the proportion of item i in a dataset.

$$\lambda = \sum_{i=1}^{R} p_i^2 \qquad \text{Equation 4}$$

Here, the Simpson Index measure the probability that two items taken at random from the catalog of items in the ecommerce marketplace represent items from the category or department. This feature can be particularly useful for use as a repeat category feature to indicate relative size and relative diversity among categories in the ecommerce marketplace. The Simpson Index can be determined, for example, using historical transaction data to calculate indexes at the customer-level and obtaining a category-level index by averaging the customer-level indexes across all customers that made purchases in the category of interest. For example, if customer A purchased 2 apples and 1 banana in the fruit category, then Equation 4 above can be used to determine a customer-level index of 5/9 using the following calculation (2/3*2/3+1/3*1/3=5/9). In this same example, a customer B who purchases 2 bananas and 2 pears in the fruit category can have a customer-level index of 1/2 using Equation 4 and the following calculation (2/4*2/4+2/4*2/4=1/2). The category-level index (for the fruit category in this example) can then be determined by averaging the customer-level indexes of customer A and customer B.

The repeat category model can be trained using supervised learning in which training data can be compiled that consists of customers that have made repeat purchases in a category of items during a particular time period (or otherwise historically). Each of these transactions can be labelled to indicate whether the customer purchased a new item in the category or did not purchase a new item in the category during the time period. This data can be used to train the repeat purchase model 418. Once the repeat purchase model 418 is sufficiently trained using known training packages and libraries, the repeat purchase model 418 can be used to determine repeat category rankings for customers.

Referring back to FIG. 4, the third component that can be used to input category information to the merging engine 408 is the item recommendation engine 406. The item recommendation engine 406 can include an item recommendation model. The item recommendation model can be used to rank items in a given category in order of likelihood that the customer will purchase the item. The data flow and approach for the item recommendation model is similar to that previously described for the discovery category model 414. For the sake of brevity, the description is not repeated here. The item recommendation model can utilize a collaborative filtering approach using matrix factorization. In a similar manner to that previously described, the item recommendation model can build a user-item matrix based on past transactions. The user-item matrix can be factorized into user factors and item factors. The items in each category can then be ranked using cosine similarity (see Equation 3) to result in item rankings that can be input into the merging engine 408.

The discovery category rankings, the repeat category rankings and the item rankings can all be input into the merging engine 408 to determine the final recommendations and featured categories that will be presented to the customer by the category recommender system 100. The merging engine 408 can include one or more algorithms, functions or sets of rules to determine which categories and items to present to the user. The merging engine 408 can blend the discovery category rankings, the repeat category rankings and the item rankings to determine the final recommendations to present to the customer.

In one example, the merging engine 408 can also use customer information to determine the final recommendations. The merging engine 408 can first determine which customer segment a particular customer can be grouped into. If the customer meets the criteria (as previously described) for a new customer, the merging engine 408 can use popularity data and/or other global recommendations that may be stored or determined from other systems to present recommendations to the customer. In this example, if the customer is a new user, the merging engine 408 may not use the discovery category rankings or the repeat category rankings to determine the final recommendations. For returning users (i.e., the nursery users, the engaged users and the super-engaged users), the merging engine can blend the discovery category rankings, the repeat category rankings and the item rankings.

For nursery users, more discovery categories and fewer repeat categories can be presented. The number of discovery categories and the number of repeat categories can differ based on the number of categories that can be presented to the customer on the ecommerce marketplace. For an ecommerce marketplace that is presented on a typical website, the number of categories that can be presented to a customer can be limited by the amount of space that can be viewed on a screen. In one example, the number of categories that are presented to a customer is limited to four categories. In such an example, the nursery users can be presented with three discovery categories and with one repeat category. The top three categories as indicated by the discovery category rankings and the top one category from the repeat category rankings can be presented to the user. Within each category, the items with the highest item recommendation rankings (from the item recommendation engine) can be displayed to the customer.

Figure 7:
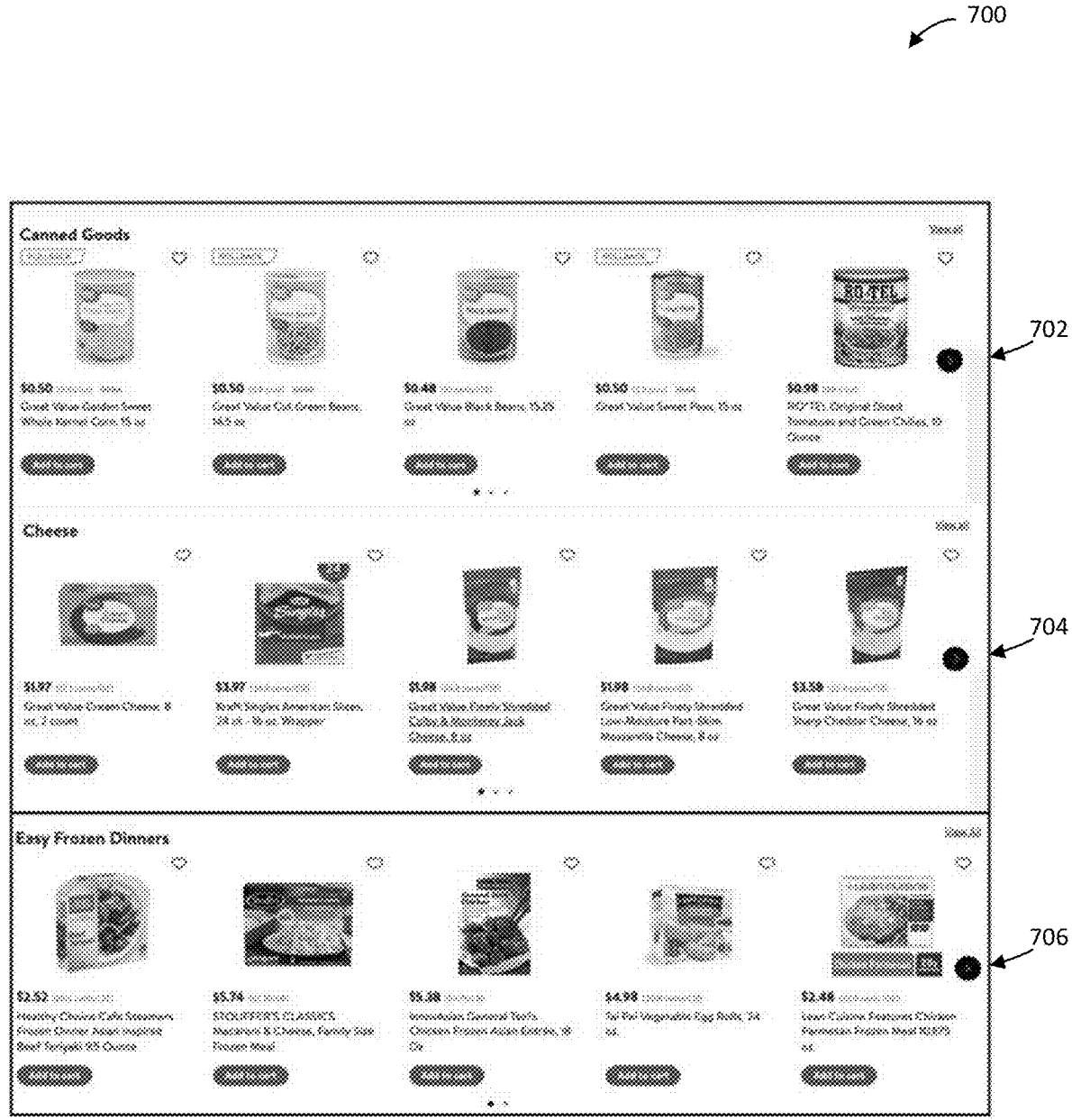
FIG. 7 is an illustration of example website displaying final recommendations that can be determined by the category recommender systems in accordance with some embodiments.

An example screen of an ecommerce marketplace is shown in FIG. 7. As shown, the website 700 can include a display of three rows of items. Each row 702, 704, 706 can correspond to a category of items. In this example, if the customer that is viewing the webpage 700 is in the nursery user customer segment. The website 700 can include two discovery categories and one repeat category. For example, the category of "canned goods" of row 702 can be the top ranked category of the discovery category rankings and the category of "cheese" of row 704 can be the second ranked category of the discovery category rankings. The category of "easy frozen dinners" of row 706 can be the top ranked category of the repeat category rankings. As can be appreciated, FIG. 7 shows one example website. Other websites or other apps, or display devices can include other layouts and other quantities of categories as may be desired.

The merging engine 408 can also cause a predetermined number of new categories and repeat categories to be displayed for an engaged customer. Generally, more repeat categories are displayed to an engaged customer than new categories. In an example where four categories can be displayed to a customer, the merging engine 408 can choose the top three repeat categories from the repeat category rankings and the top one discovery category from the discovery category rankings to determine the final recommendations. As previously stated, the top items from each of the repeat categories and the discovery categories, as determined by the item rankings, can be included in the final recommendations. In other circumstances where the number of categories that are displayed to the customer more or less than four categories, other blends of categories can be used.

The merging engine 408 can also determine the final recommendations for super-engaged customers. Generally, super-engaged customers are shown mostly repeat categories. In the context where four categories can be shown to a customer, the merging engine 408 can determine the final recommendations by selecting the top four repeat categories from the repeat category rankings. If the super-engaged customer only purchases items from a single category or from two categories, the merging engine 408 can determine to include discovery category rankings based on the discovery category rankings.

The merging engine 408 can also include other rules or functions to determine the final recommendations. For example, the merging engine 408 can include a rule that causes the discovery categories (if selected for display) to be positioned at the top of the display to encourage customer to purchase new items. The merging engine 408 can include another rule that causes the final recommendations to backfill with discovery categories if there are not enough repeat categories in the repeat category rankings to fill the final recommendations. In still other examples, other rules, filters and functions can be used by the merging engine 408 to determine the final recommendations.

The example merging rules described above can be determined based on an analysis or observations of trends of the customer information. For example, the customer information 410 can be used to analyze features and the different levels at which the customers behave differently. For example, clustering, regression or other suitable techniques can be used to determine different levels at which customers behave differently during transactions on the ecommerce website. In the present example, it has been determined that customers behave differently, in general, after the customer has made more than four purchases on the ecommerce marketplace. For this reason, the customer segmentation includes groups that are categorized as less than five transactions (i.e., nursery users) and five or more transactions (i.e., engaged and super-engaged users). Similarly, a data-driven analysis has also determined that customers that regularly make transactions on the ecommerce marketplace (as defined by the characteristics of the super-engaged users previously described) are more likely to make purchases from the same categories repeatedly. In other examples, a data-driven analysis can be used to determine other rules for merging the discovery category rankings, the repeat category rankings and the item rankings.

Figure 8:
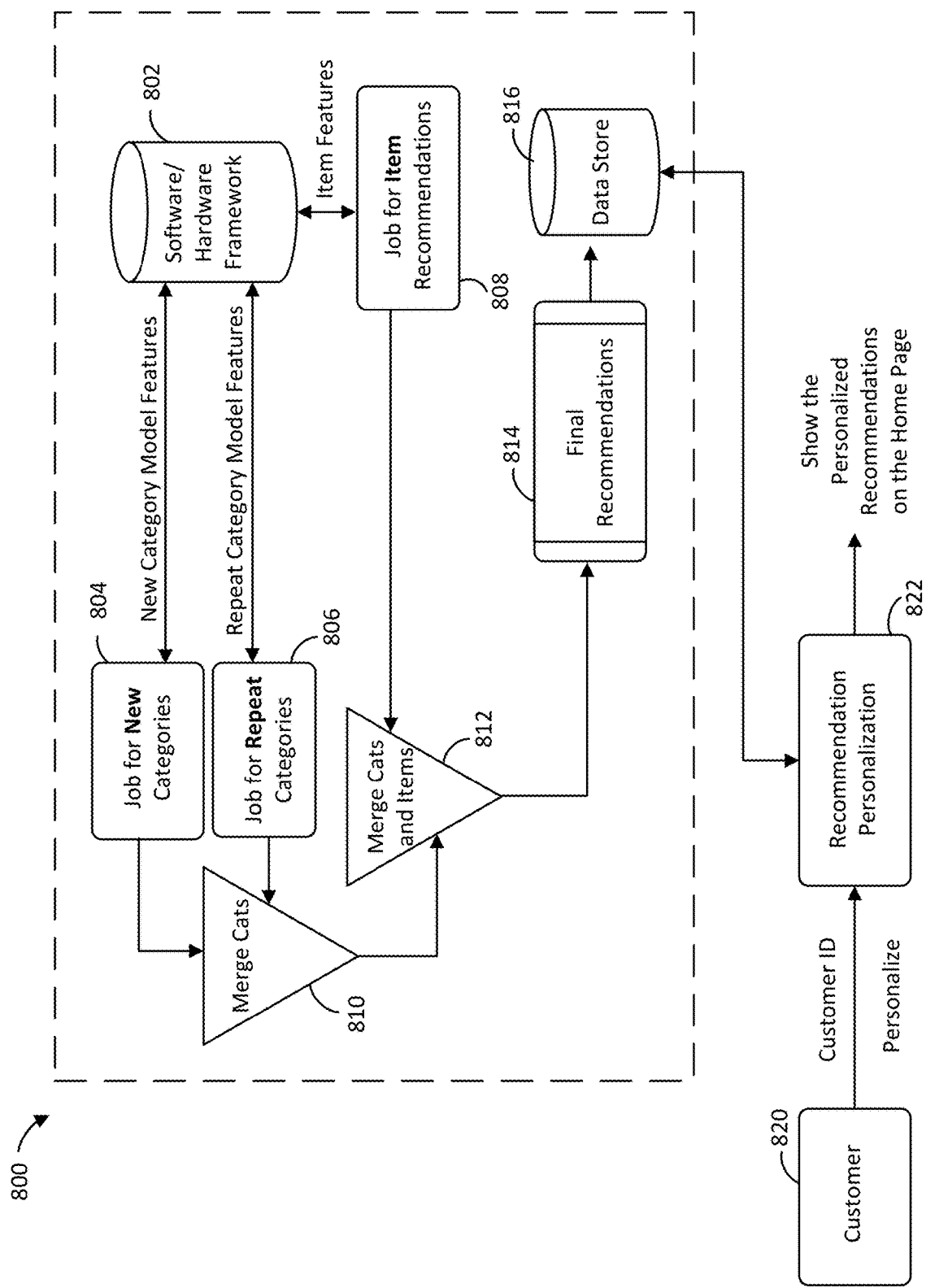
FIG. 8 is a block diagram illustrating an example architecture of the category recommender system in accordance with some embodiments.

Referring now to FIG. 8, an illustration of an example architecture 800 for the recommender system 400 is shown. In the example shown, the architecture 800 can include a software/hardware framework 802. The framework 802 can allow the processing of large amounts of data over a distributed network of computing devices. The framework can use the Apache Hadoop utilities or other software libraries, for example. Jobs can be submitted or executed by the framework 802 as indicated by job 804 for new (or discovery) categories, job 806 for repeat categories and job 808 for item recommendations. The jobs 804, 806, 808 can be submitted and executed by the framework 802 to perform the operations and functions as previously described to determine the discovery category rankings, the repeat category rankings and the item rankings, respectively. Any suitable tools or libraries can be used that are compatible with the framework 802. In the example where Hadoop utilities are used for the framework, the jobs 804, 806, 808 can use Spark and/or Hive to interface with the Hadoop framework and submit and execute suitable jobs to obtain the rankings. In other examples, other tools and libraries can be used.

As further shown, the repeat category rankings and the repeat category rankings can be merged at 810 using suitable processing techniques and the item rankings can then be merged at 812 to result in the final recommendations 814. The final recommendations can then be stored in a suitable data store 816. When a customer 820 interacts with the ecommerce website (e.g., by accessing the retailer's website on a customer computing device), the customer's ID and other personalization information can be obtained by the recommender system. At the functional block 822, the customer ID and other personalization information can identify the customer and determine which customer segment the customer is grouped into. Based on this information, and the information obtained from the data store 816, the recommendations can be personalized displayed to the customer on the home page of the retailer's website.

Figure 9:
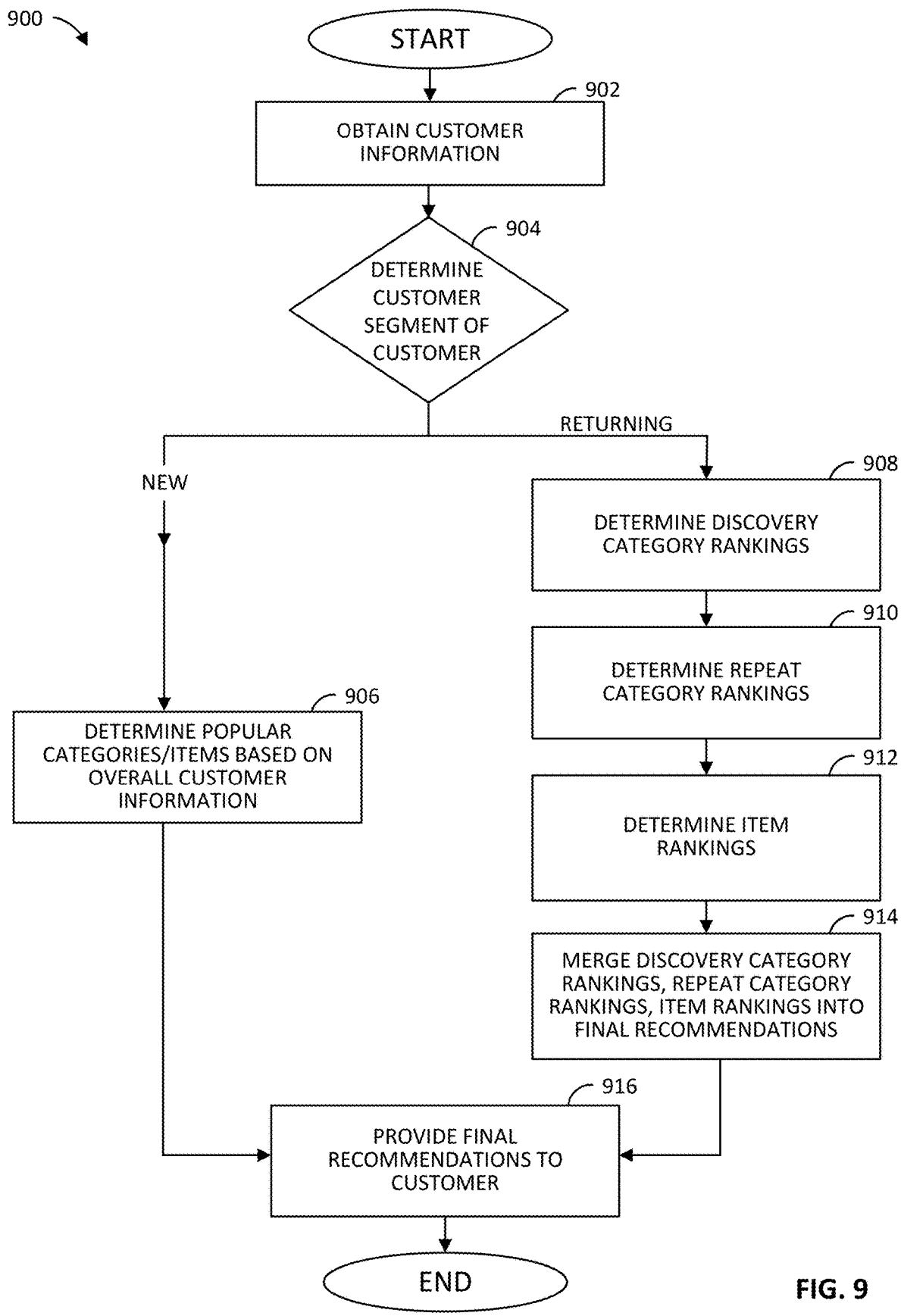
FIG. 9 is a flow chart illustrating an example method of determining category recommendations in accordance with the present disclosure.

Referring now to FIG. 9, a method 900 of determining personalized recommendations based on customer segmentation is shown. The method 900 can, for example, be performed by any of the example recommender systems described in the present disclosure. The method 900 and the steps described below can also be performed by other recommender systems and/or by variations of the recommender systems described herein. The description below described the methods as performed by the example category recommender systems 300 or 400. It should be appreciated, however, that the description below is not intended to limit the method to the example category recommender systems 300, 400.

At step 902, the recommender computing device 102 can obtain customer information. The method 900 can begin when a customer begins interacting with an ecommerce marketplace such as a retailer's website. The website (or other implementation) can obtain a customer identification or other identifying information of the customer. Based on this identifying information the recommender computing device 102 can obtain the customer information that can include historical or past information regarding the customer's interactions with the website. The recommender computing device 102 can obtain the customer information using any suitable method or technique. In one example, the customer information can be obtained from the database 108. In other examples, the recommender computing device 102 can obtain the customer information from other data stores, servers or the like.

At step 904, the recommender computing device 102 can determine a customer segment of the customer. Two or more customer segments can be determined that have different purchasing behavior on the ecommerce marketplace. Such customer segments can be determined by analysis and/or observation of historical customer transaction information on the ecommerce website. The customer segments can be defined using one more characteristics of purchasing behavior of a customer. In one example, as described above, customers can be grouped into new customers that have no previous purchases on the ecommerce marketplace and returning customers that have previously interacted on the ecommerce marketplace. Among the returning customers, further customer segments can be defined. One example of further segmentation is the grouping of returning customers into nursery users, engaged users and super-engaged users as previously described. The recommender computing device 102 can determine which customer segment that a customer falls into by comparing customer information regarding previous interactions on the ecommerce website to predetermined customer segment definitions. As previously described, the returning customer segments can be defined as: nursery customers that have two to four transactions on the ecommerce marketplace, engaged customers that have more than five transactions within a thirteen week period and with an average gap between orders of greater than seven days, and super-engaged customers that have more than five transactions within a thirteen week period and with an average gap between orders of less than or equal to seven days. In other examples, other predetermined customer segment definitions can be used.

If the recommender computing device 102 determines that a customer is a new customer, the method 900 continues to step 906. If the recommender computing device 102 determines that a customer is a returning customer, the recommender computing device can further determine which type of returning customer the customer is. The method continues to step 908 if the customer is a returning customer.

At step 906, the recommender computing device 102 can determine popular categories and items based on overall customer information. Personalized recommendations are not determined when the customer is a new customer because no historical customer information such as historical transaction information is available for the new customer. Instead, the recommender computing device 102 can determine final recommendations that include the most popular categories and items on the ecommerce marketplace. Such information can be retrieved from a data store such as database 108. Overall customer information (i.e., information from all customers that have used the ecommerce website) can be used to determine the popular categories and items. In other examples, other characteristics can be used to determine the final recommendations for new customers such as the highest rated categories and items, most viewed categories and items, most shared categories and items or blends of any of the foregoing. After step 906, the method can continue to step 916 in which the recommender computing device 102 can provide the final recommendations to the customer as will be further described below.

In the circumstance in which the customer is identified as a returning customer, the recommender computing device 102 can determine discovery category rankings at step 908. The discovery category engine, for example, can determine the discovery category rankings using a discovery category model. Any suitable technique can be used to determine the discovery category rankings such as those methods describe above. For example, the discovery category engine can use collaborative filtering based approach using matrix factorization to determine the discovery category rankings. In other examples, other methods can be used.

At step 910, the recommender computing device 102 can determine repeat category rankings. The repeat category engine, for example, can determine the repeat category rankings using a repeat category model. Any suitable technique can be used to determine the repeat category rankings such as those methods described above. For example, the repeat category engine can determine the repeat category rankings using a random forest model that can use various repeat category features. Among the repeat category features a Simpson Index for each category can be used. In other examples, other methods can be used to determine the repeat category rankings.

At step 912, the recommender computing device 102 can determine item rankings. The item recommendation engine, for example, can determine the item rankings using an item recommendation model. Any suitable technique can be used to determine the item rankings such as those methods described above. For example, the item recommendation engine can determine the item rankings using a collaborative filtering based approach using matric factorization. In other examples, other methods can be used to determine the item rankings.

At step 914, the discovery category rankings, the repeat category rankings, and the item rankings can be merged to determine the final recommendations. The merging engine can merge the rankings into the final recommendations. Any suitable technique can be used to merge the rankings into the final recommendations such as those methods described above. For example, the merging engine can use one or more merging criteria to determine a number or blend of the discovery categories and the repeat categories to include in the final recommendations. In some examples, the merging criteria can be based on the customer segment of the customer. In other examples, other methods can be used to merge the rankings into the final recommendations.

At step 916, the final recommendations can be provided to the customer. The final recommendations can be provided, displayed or presented to the customer in any suitable manner. In one example, the final recommendations can be provided to the customer on the retailer's website in the form of two or more carousels. In other examples, the final recommendations can be provided in other suitable forms such as in alerts, texts, messages, images, banners, lists, tables or the like.

The foregoing examples focused on descriptions of the principles and teachings of the present disclosure used in the context of a retailer and an ecommerce marketplace. As can be appreciated, the methods and apparatuses described herein can be applied in various contexts and in various industries. The method and apparatuses of the present disclosure can identify discovery and repeat categories that may exist in other industries and environments such as in the financial services, health services and other industries as well.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The term model as used in the present disclosure includes data models created using machine learning. Machine learning may involve training a model in a supervised or unsupervised setting. Machine learning can include models that may be trained to learn relationships between various groups of data. Machine learned models may be based on a set of algorithms that are designed to model abstractions in data by using a number of processing layers. The processing layers may be made up of non-linear transformations. The models may include, for example, artificial intelligence, neural networks, deep convolutional and recurrent neural networks. Such neural networks may be made of up of levels of trainable filters, transformations, projections, hashing, pooling and regularization. The models may be used in large-scale relationship-recognition tasks. The models can be created by using various open-source and proprietary machine learning tools known to those of ordinary skill in the art.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:
1. A system comprising:
a computing device configured to:
obtain customer information characterizing a customer's interactions, via a user interface, on an ecommerce marketplace;
determine discovery category rankings, using a trained discovery category machine learning model, for each first category of items available on the ecommerce marketplace for the customer based on the customer information, wherein:
each discovery category ranking ranks a respective first category of items based on a likelihood that the customer will choose an item in the respective first category to further explore and possibly purchase, and
the customer has not purchased any item from the respective first category before;
determine repeat category rankings, using a trained repeat category machine learning model, for each second category of items available on the ecommerce marketplace for the customer based on the customer information, wherein:
  each repeat category ranking ranks a respective second category of items based on a likelihood that the customer will purchase a new item in the respective second category,
  the customer has never purchased the new item before, and
  the customer has previously purchased at least one item in the respective second category;
determine item rankings for each item in the ecommerce marketplace based on the customer information, wherein each item ranking ranks a respective item based on a likelihood that the customer will purchase the respective item;
merge the discovery category rankings, the repeat category rankings and the item rankings into final recommendations based on one or more predetermined merging criteria;
display, via the user interface, the final recommendations to the customer;
generate purchase data of the customer, the purchase data including data of whether the customer purchased an item selected from the final recommendations; and
refine the trained repeat category machine learning model based on the purchase data.

2. The system of claim 1, further comprising determining a customer segment of the customer based on past transactions of the customer on the ecommerce marketplace, and wherein the predetermined merging criteria are based on the customer segment of the customer.

3. The system of claim 1, wherein the discovery category rankings are determined by a discovery category engine using collaborative filtering and matrix factorization.

4. The system of claim 1, wherein:
  the trained discovery category machine learning model is trained to learn relationships between various groups of data;
  the trained discovery category machine learning model is based on a set of algorithms that are designed to model abstractions in data by using a number of processing layers;
  the processing layers are made up of non-linear transformations; and
  the trained discovery category machine learning model includes at least one of: artificial intelligence, neural networks, deep convolutional or recurrent neural networks.

5. The system of claim 1, wherein the repeat category rankings are determined by a repeat category engine using a random forest model with a plurality of repeat category features.

6. The system of claim 5, wherein the plurality of repeat category features comprises a Simpson Index for each category.

7. The system of claim 1, wherein the item rankings are determined by an item recommendation engine using collaborative filtering and matrix factorization.

8. The system of claim 1, wherein the item rankings indicate items in selected discovery categories and selected repeat categories to include in the final recommendations.

9. The system of claim 1 further comprising:
  presenting, on a screen, the user interface for the ecommerce marketplace;
  determining an amount of space that can be viewed on the screen;
  determine a number of discovery categories, a number of repeat categories, and a number of items for each category, based on the amount of space that can be viewed on the user interface, according to the final recommendations; and
  update the user interface, based on the number of discovery categories, the number of repeat categories, and the number of items for each category, for further interactions by the customer.

10. A method comprising:
obtaining customer information characterizing a customer's interactions, via a user interface, on an ecommerce marketplace;
determining discovery category rankings, using a trained discovery category machine learning model, for each first category of items available on the ecommerce marketplace for the customer based on the customer information, wherein
  each discovery category ranking ranks a respective first category of items based on a likelihood that the customer will choose an item in the respective first category to further explore and possibly purchase, and
  the customer has not purchased any item from the respective first category before;
determining repeat category rankings, using a trained repeat category machine learning model, for each second category of items available on the ecommerce marketplace for the customer based on the customer information, wherein
  each repeat category ranking ranks a respective second category of items based on a likelihood that the customer will purchase a new item in the respective second category,
  the customer has never purchased the new item before, and
  the customer has previously purchased at least one item in the respective second category;
determining item rankings for each item in the ecommerce marketplace based on the customer information, wherein each item ranking ranks a respective item based on a likelihood that the customer will purchase the respective item;
merging the discovery category rankings, the repeat category rankings and the item rankings into final recommendations based on one or more predetermined merging criteria;
displaying, via the user interface, the final recommendations to the customer;
generating purchase data of the customer, the purchase data including data of whether the customer purchased an item selected from the final recommendations; and
refining the trained repeat category machine learning model based on the purchase data.

11. The method of claim 10, further comprising determining a customer segment of the customer based on past transactions of the customer on the ecommerce marketplace, and wherein the predetermined merging criteria are based on the customer segment of the customer.

12. The method of claim 10, wherein the discovery category rankings are determined by a discovery category engine using collaborative filtering and matrix factorization.

13. The method of claim 10, wherein:
  the trained discovery category machine learning model is trained to learn relationships between various groups of data;

the trained discovery category machine learning model is based on a set of algorithms that are designed to model abstractions in data by using a number of processing layers;

the processing layers are made up of non-linear transformations; and the trained discovery category machine learning model includes at least one of: artificial intelligence, neural networks, deep convolutional or recurrent neural networks.

14. The method of claim 10, wherein the repeat category rankings are determined by a repeat category engine using a random forest model with a plurality of repeat category features.

15. The method of claim 14, wherein the plurality of repeat category features comprises a Simpson Index for each category.

16. The method of claim 10, wherein the item rankings are determined by an item recommendation engine using collaborative filtering and matrix factorization.

17. The method of claim 10, wherein the item rankings indicate items in selected discovery categories and selected repeat categories to include in the final recommendations.

18. A non-transitory computer readable medium having instructions stored thereon, wherein the instructions, when executed by at least one processor, cause a device to perform operations comprising:

obtaining customer information characterizing a customer's interactions, via a user interface, on an ecommerce marketplace;

determining discovery category rankings, using a trained discovery category machine learning model, for each first category of items available on the ecommerce marketplace for the customer based on the customer information, wherein each discovery category ranking ranks a respective first category of items based on a likelihood that the customer will choose an item in the respective first category to further explore and possibly purchase, and the customer has not purchased any item from the respective first category before;

determining repeat category rankings, using a trained repeat category machine learning model, for each second category of items available on the ecommerce marketplace for the customer based on the customer information, wherein each repeat category ranking ranks a respective second category of items based on a likelihood that the customer will purchase a new item in the respective second category, the customer has never purchased the new item before, and the customer has previously purchased at least one item in the respective second category;

determining item rankings for each item in the ecommerce marketplace based on the customer information, wherein each item ranking ranks a respective item based on a likelihood that the customer will purchase the respective item;

merging the discovery category rankings, the repeat category rankings and the item rankings into final recommendations based on one or more predetermined merging criteria;

displaying, via the user interface, the final recommendations to the customer;

generating purchase data of the customer, the purchase data including data of whether the customer purchased an item selected from the final recommendations; and refining the trained repeat category machine learning model based on the purchase data.

19. The non-transitory computer readable medium of claim 18, wherein the instructions cause the device to perform further operations comprising determining a customer segment of the customer based on past transactions of the customer on the ecommerce marketplace, and wherein the predetermined merging criteria are based on the customer segment of the customer.

20. The non-transitory computer readable medium of claim 18, wherein the discovery category rankings are determined by a discovery category engine using collaborative filtering and matrix factorization.

21. The non-transitory computer readable medium of claim 18, wherein the repeat category rankings are determined by a repeat category engine using a random forest model with a plurality of repeat category features, the plurality of repeat category features comprising a Simpson Index for each category.

* * * * *